G. C. HALL.
COVER FOR MILK CANS.
APPLICATION FILED AUG. 4, 1911.
1,033,009.
Patented July 16, 1912.
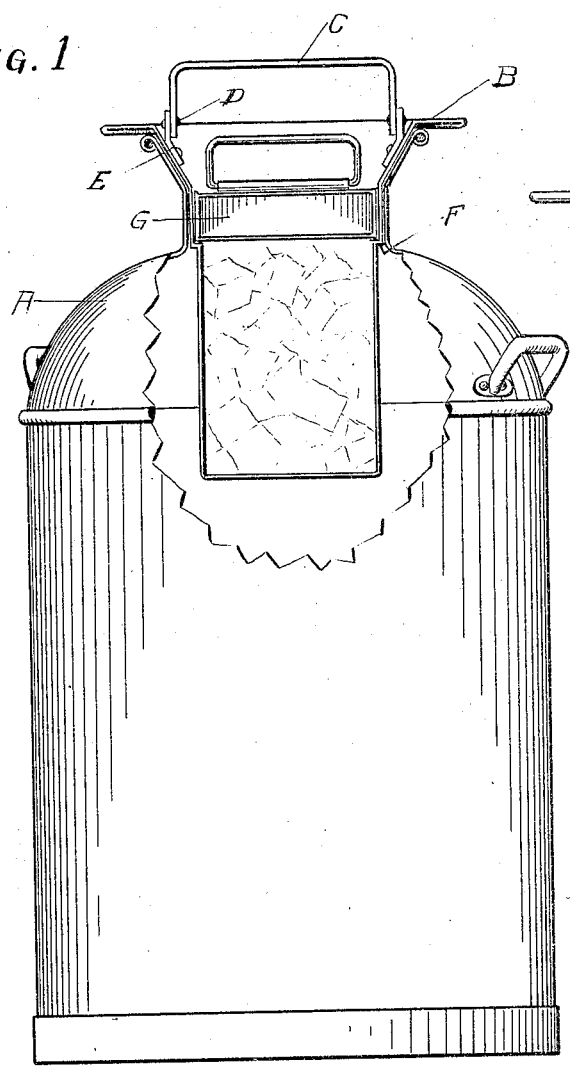
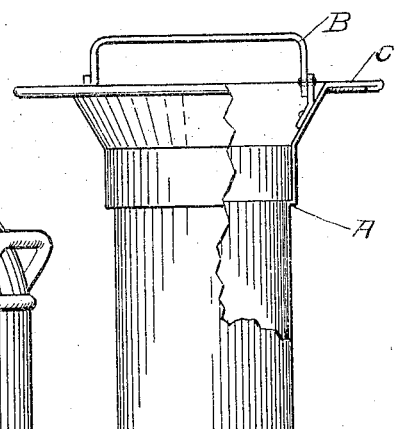
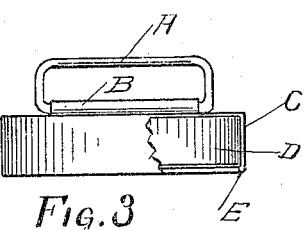
WITNESSES:
Ada Tornow
Anna Noone
George C. Hall
INVENTOR
BY
Clarke E. Baldwin
ATTORNEY

UNITED STATES PATENT OFFICE.

GEORGE C. HALL, OF ADRIAN, MICHIGAN.

COVER FOR MILK-CANS.

1,033,009.   Specification of Letters Patent.   Patented July 16, 1912.

Application filed August 4, 1911.   Serial No. 642,306.

*To all whom it may concern:*

Be it known that I, GEORGE C. HALL, a citizen of the United States, residing at No. 34 North McKenzie street, in the city of Adrian, in the county of Lenawee and State of Michigan, have invented a new and useful cover for milk-cans and all other receptacles of whatever kind and nature where it becomes necessary or desirable to keep the contents thereof cool, of which the following is a specification.

My invention relates to an improvement in a cover to be used as above outlined, which cover is designed to have an extension from the lower part thereof which may be extended at any distance into the receptacle where it is used, and into this extension of the bottom or lower part of said cover, ice or other cooling substances may be placed for the purpose of producing a cooling and refrigerating effect upon the milk or any other liquid substance or compound that it may be desired or necessary to keep at a lower temperature and to keep the same cool, so that it may be more sanitary; and the objects of my improvement are: 1. To provide a cover as above described, which may be used in any and all receptacles where it becomes desirous or necessary to keep the contents thereof at a lower temperature than they otherwise would be. 2. And to provide an improvement whereby ice or other substances may be placed in said cover and used in said receptacles, and said cover at all times to be sanitary, and to keep the ice and other cooling substances away from the contents of said receptacles in such a manner that the contents of said receptacles may be cooled and still kept from contamination or any un-sanitary effect. 3. That the improvement may be used in any sized can or receptacle simply by extending the length of the cover, or that part of the cover which may be used for refrigerating purposes, so that the same may meet any need that would be required in having the same extended to the bottom of a can or other receptacle, or simply extend into it part of the distance.

I attain these objects by the mechanism illustrated in the accompanying drawing in which—

Figure 1 shows the form of the cover with said attachment as it might be used in the ordinary ten gallon milk can, A representing the can, B represents the cover as it is in place at the mouth of the can, C represents the handle to the cover, it being in a proper position for raising the cover from the can, said handle being constructed in such a manner that it may be turned down in the mouth of said can when not in use and fastened at either side by a bolt marked "D", which passes through and is fastened to an ear which is also fastened to the upper part of the cover, said ear being marked "E", said handle or bail being movable so that the cover may be filled with ice or other substance as may be desired without removing the cover from the can or other receptacle. In the top of said cover and resting upon a shoulder placed in and around said cover marked "F" is an inner cover for keeping the contents of the main cover intact, this inner cover being marked "G", into which inner cover is fastened a loose handle which is movable and may be raised when it is desired to move the inner cover.

Fig. 2, represents the main cover as it is designed, showing the shoulder marked "A'", upon which the inner cover rests. "B", the handle and the ear and bolt which hold it in place, "C" the extension at the top of the can for holding the cover in place.

Fig. 3, represents the inner cover, "A" being the handle, "B" the top of the cover into which the handle fits, and may be moved up or down as desired for use, "C'" represents the outer edge of the inner cover. "D" represents the inside of the cover which is hollow, it being designed that the inner cover should be so constructed that there would be an air chamber between the upper and lower part of this cover, and that the same could be made either round, square or in any other shape, so that the lower edge "E" would fit upon the shoulder which is provided for in Fig. 1, as shown by letter "F", and Fig. 3 represents a side view of the inner cover, and when placed in position this inner cover would fit into the top of the outside cover and keep the air and other substances from passing into the main cover or into the ice or other substances that the main cover might contain, and could be readily removed without taking out the main cover and ice or other substances used for the purpose of refrigeration placed in the main cover, without taking it from the can.

What I claim as my invention and desire to secure by Letters Patent, is:

The combination with the flaring mouth of a milk can, of a removable ice receiving receptacle having a flared mouth adapted to be snugly received by the mouth of the can, an outwardly projecting lateral flange forming a continuation of the flared mouth of the receptacle and adapted to bindingly engage with and extend beyond the upper edge of the mouth of the can, an annular seat forming a part of said receptacle, a closure for the latter and engaging with the seat, a handle hingedly secured to the upper flared mouth of the receptacle and adapted to be closed within the same, and a handle hingedly secured to the closure and foldable against the same and within the handle secured to the receptacle, whereby said handles are adapted to be turned below the projecting flanged portion of the receptacle.

GEORGE C. HALL.

Witnesses:
ADA TORNOW,
ANNA NOONE.